(12) United States Patent
Chen et al.

(10) Patent No.: US 11,487,141 B1
(45) Date of Patent: Nov. 1, 2022

(54) DIMMER

(71) Applicant: LIQXTAL TECHNOLOGY INC., Tainan (TW)

(72) Inventors: Hung-Shan Chen, Tainan (TW); Ming-Syuan Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 17/700,437

(22) Filed: Mar. 21, 2022

Related U.S. Application Data

(60) Provisional application No. 63/222,399, filed on Jul. 15, 2021.

(51) Int. Cl.
*G02F 1/133* (2006.01)
*G02F 1/1335* (2006.01)

(52) U.S. Cl.
CPC .... *G02F 1/13306* (2013.01); *G02F 1/133528* (2013.01)

(58) Field of Classification Search
CPC .................................................. G02F 1/13306
See application file for complete search history.

(56) References Cited

U.S. PATENT DOCUMENTS

2011/0285930 A1* 11/2011 Kimura ............... H01L 27/1225
349/43
2018/0074356 A1* 3/2018 Okuyama ............... G02F 1/163

* cited by examiner

*Primary Examiner* — Edmond C Lau
(74) *Attorney, Agent, or Firm* — Winston Hsu

(57) ABSTRACT

A dimmer includes a liquid crystal (LC) panel and a driving circuit. The LC panel has a plurality of LCs doped with dichroic dye. The LC panel comprises a plurality of pixels. The driving circuit is electrically connected to the LC panel, and configured to control driving of the pixels of the LC panel. At least one of the pixels has a storage capacitor and an LC capacitor coupled in parallel. A ratio of a capacitance value of the LC capacitor to a capacitance value of the storage capacitor is greater than 10:1. The driving circuit is configured to control an LC angle of LCs in each of the pixels, and the dichroic dye is driven by surrounding LCs and presents an angle correlated with the LC angle of the surrounding LCs.

11 Claims, 9 Drawing Sheets

DIMMER

CROSS REFERENCE TO RELATED APPLICATIONS

This application claims priority to U.S. Provisional Patent Application No. 63/222,399, filed on Jul. 15, 2021, the disclosure of which is incorporated herein by reference in its entirety.

BACKGROUND OF THE INVENTION

1. Field of the Invention

The present invention is related to a dimmer, and more particularly, to a dimmer with a liquid crystal (LC) panel having a greater aperture ratio and a high maximum transmittance.

2. Description of the Prior Art

A dimmer is an important component for an augmented reality (AR) system to adjust intensity of the ambient light for enhancing the contrast of the virtual images. By using liquid crystal display (LCD) technology, the dimmer can be easily implemented by a liquid crystal (LC) panel and two polarizers. However, the two polarizers severely limit a maximum transmittance of the incident light. Since greater maximum transmittance and pixelated control are required for AR application, there is a need for a novel method and associated architecture to improve the maximum transmittance for solving the problems without introducing any side effect or in a way that is less likely to introduce a side effect.

SUMMARY OF THE INVENTION

It is therefore an objective of the present invention to provide a dimmer with a LC panel having a greater aperture ratio and a high maximum transmittance, in order to solve the above-mentioned problems.

At least one embodiment of the present invention provides a dimmer comprising a liquid crystal (LC) panel and a driving circuit. The LC panel has a plurality of LCs doped with dichroic dye. The LC panel comprises a plurality of pixels. The driving circuit is electrically connected to the LC panel, and configured to control driving of the plurality of pixels of the LC panel. At least one of the plurality of pixels has a storage capacitor and an LC capacitor coupled in parallel. A ratio of a capacitance value of the LC capacitor to a capacitance value of the storage capacitor is greater than 10:1. The driving circuit is configured to control an LC angle of LCs in each of the plurality of pixels, and the dichroic dye is driven by surrounding LCs and presents an angle correlated with the LC angle of the surrounding LCs.

The dimmer of the present invention can achieve a greater aperture ratio through reducing or removing the storage capacitor, and achieve a high maximum transmittance by using fewer polarizers. An LC panel of the dimmer is able to set the polarization direction and the sensitivity of polarization by arranging the LCs and the dichroic dye, such that the dimmer of the present invention can make the difference between brightness and darkness more obvious.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
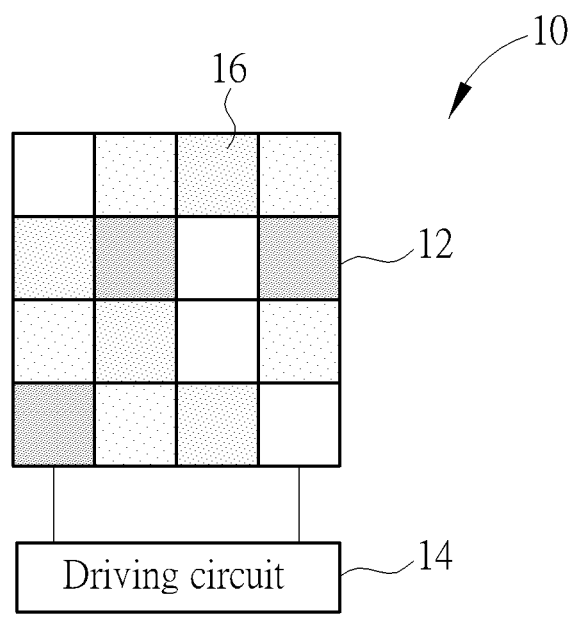
FIG. 1 is a diagram of a dimmer according to an embodiment of the present invention.
Figure 2:
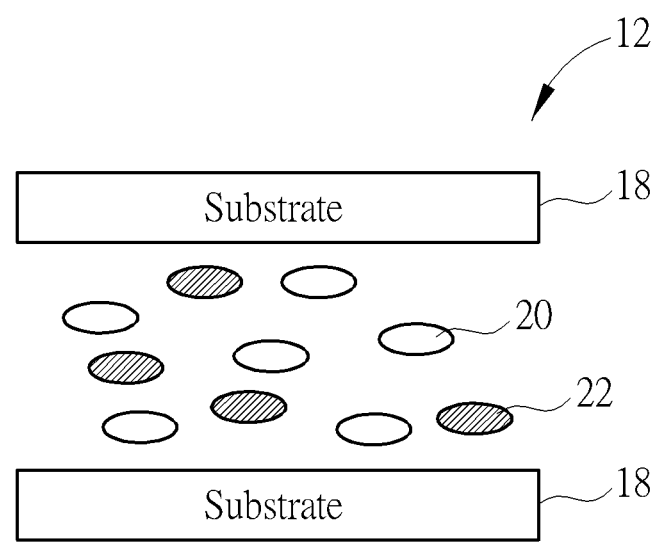
FIG. 2 is a diagram illustrating a structure of a liquid crystal (LC) panel of the dimmer according to an embodiment of the present invention.

Please refer to FIG. 1. FIG. 1 is a diagram of a dimmer 10 according to an embodiment of the present invention. As shown in FIG. 1, the dimmer 10 comprises a liquid crystal (LC) panel 12 and a driving circuit 14 electrically connected to the LC panel 12. The LC panel 12 comprises a plurality of pixels 16 in a matrix format. The driving circuit 14 is configured to control driving of the pixels 16 of the LC panel 1, and more particularly, the driving circuit 14 may control dimming of each one of the pixels 16. Please refer to FIG. 2. FIG. 2 is a diagram illustrating a structure of the LC panel 12 of the dimmer 10 shown in FIG. 1 according to an embodiment of the present invention. As shown in FIG. 2, the LC panel 12 comprises at least one substrate 18 and a plurality of LCs 20 arranged on the at least one substrate 18. In the present embodiment, the LCs 20 of the LC panel 12 are arranged between two substrates 18. The LC panel 12 further has the LCs 20 doped with dichroic dye 22. The driving circuit 14 is configured to control an LC angle of LCs 20 in each of the pixels by applying voltage on the pixels 16, where the dichroic dye 22 is driven by surrounding LCs 20 and presents an angle correlated with the LC angle of the surrounding LCs 20.

Figure 3:
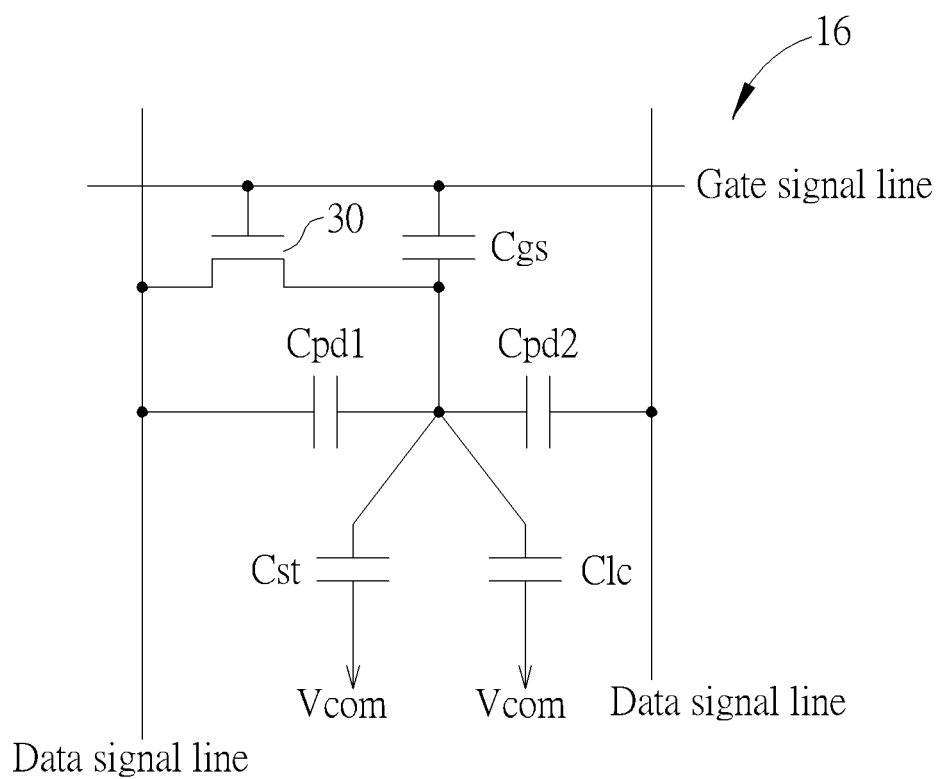
FIG. 3 is schematic of a pixel of the LC panel of the dimmer according to an embodiment of the present invention.

Please refer to FIG. 3. FIG. 3 is schematic of one pixel 16 of the LC panel 12 of the dimmer 10 shown in FIG. 1 according to an embodiment of the present invention. In the present embodiment, the LC panel 12 is a thin-film transistor (TFT) LC panel, and each pixel 16 has a TFT circuit. As shown in FIG. 3, a TFT 30 is electrically connected to a gate signal line in a gate terminal and to a data signal line. An overlay capacitor Cgs, a first coupling capacitor Cpd1 and a second coupling capacitor Cpd2 may exist between a terminal of the TFT 30 and the gate signal line or the data signal line. A storage capacitor Cst and an LC capacitor Clc are coupled in parallel and electrically connected to the terminal of the TFT 30 and a reference voltage Vcom. In the present embodiment, in at least one of the pixels 16 (e.g., each pixel 16), a ratio of a capacitance value of the LC capacitor Clc to a capacitance value of the storage capacitor Cst is greater than 10:1. In other words, the capacitance of the storage capacitor Cst is intentionally reduced. For example, the storage capacitor Cst may have a 1/10 capacitance value to the LC capacitor Clc or the storage capacitor Cst may be removed. As a result, the aperture ratio is greater by reducing or removing the storage capacitor Cst. In the present embodiment, the LC panel 12 has an aperture ratio greater than 95%.

Figure 4:
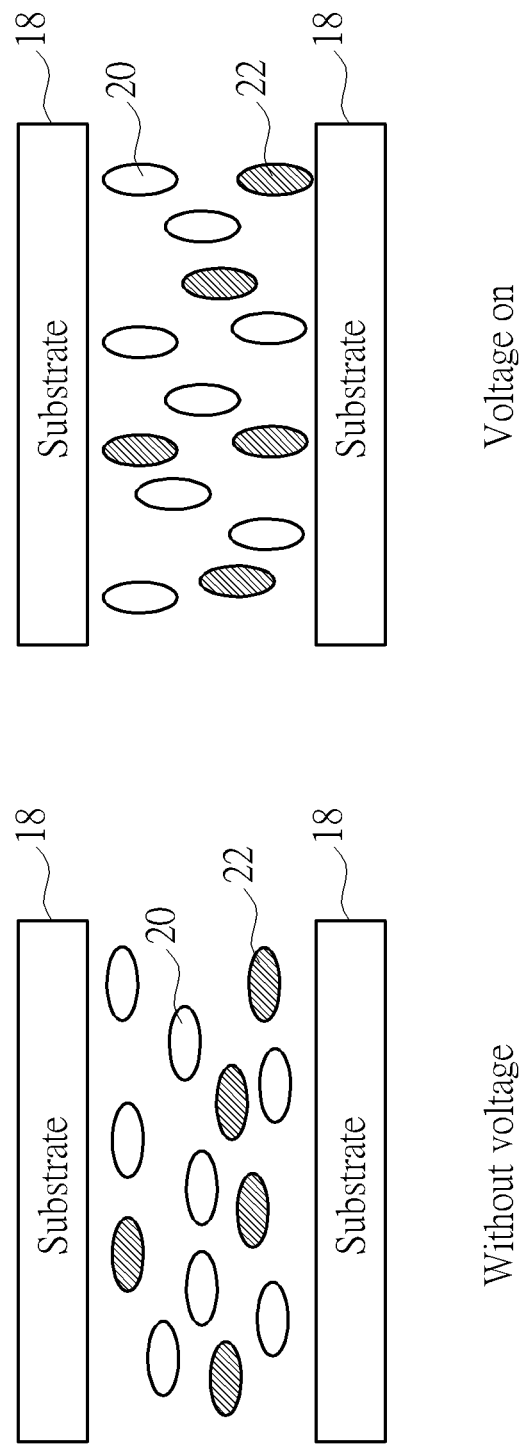
FIG. 4 is a diagram illustrating a plurality of LCs with dichroic dye in the LC panel in an LC mode of Electrically Controlled Birefringence (ECB) being not applied with voltage and being applied with voltage according to an embodiment of the present invention.

The driving circuit 14 is configured to control an LC angle of LCs 20, and the dichroic dye 22 is driven by surrounding LCs 20 and presents an angle correlated with the LC angle of the surrounding LCs 20. For example, the angle of the dichroic dye 22 may be driven to be substantially similar to the angle of the surrounding LCs 20. Please refer to FIG. 4. FIG. 4 is a diagram illustrating the LCs 20 with dichroic dye 22 in the LC panel 12 in an LC mode of Electrically Controlled Birefringence (ECB) being not applied with voltage and being applied with voltage according to an embodiment of the present invention. As shown in FIG. 4, when the LC panel 12 is a TFT LC panel and an LC mode of the LCs 20 in the TFT LC panel 12 is ECB, the LCs 20 and the dichroic dye 22 are arranged along a direction parallel to the substrate 18 without being applied with voltage (labeled "without voltage" in FIG. 4 for brevity). When the driving circuit 14 applies an appropriate voltage on the ECB mode TFT LC panel, the LCs 20 and the dichroic dye 22 are driven to be arranged along a direction perpendicular to the substrate 18 (labeled "voltage on" in FIG. 4 for brevity).

Figure 5:
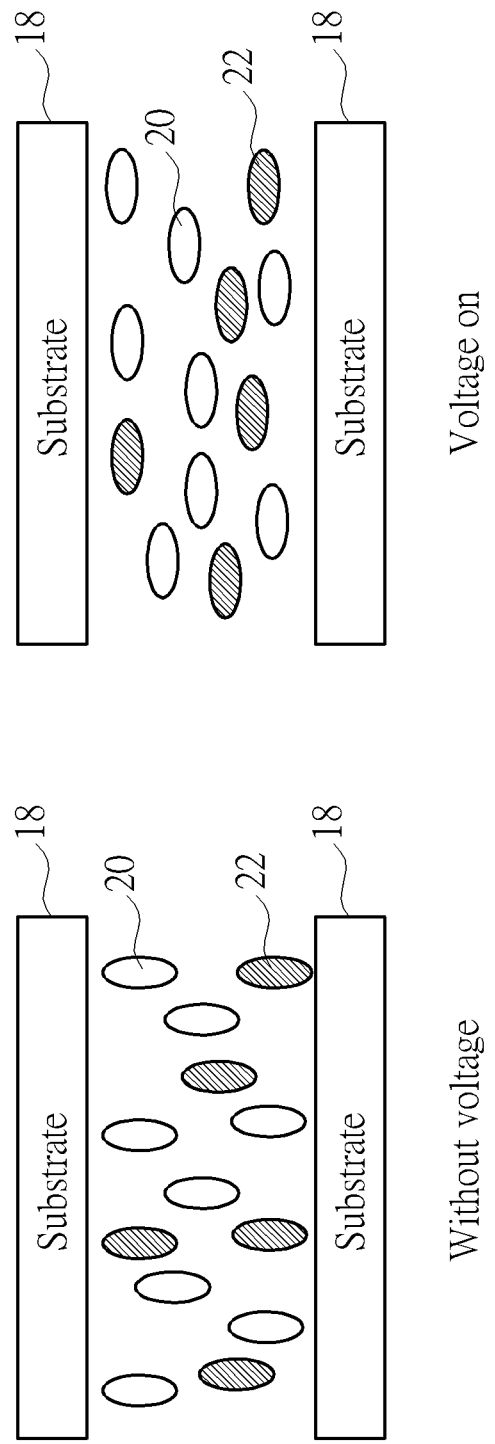
FIG. 5 is a diagram illustrating a plurality of LCs with dichroic dye in the LC panel in an LC mode of Vertical Alignment (VA) being not applied with voltage and being applied with voltage according to an embodiment of the present invention.

Please refer to FIG. 5. FIG. 5 is a diagram illustrating the LCs 20 with dichroic dye 22 in the LC panel 12 in an LC mode of Vertical Alignment (VA) being not applied with voltage and being applied with voltage according to an embodiment of the present invention. As shown in FIG. 5, when the LC panel 12 is a TFT LC panel and an LC mode of the LCs 20 in the TFT LC panel 12 is VA, the LCs 20 and the dichroic dye 22 are arranged along a direction perpendicular to the substrate 18 without being applied with voltage (labeled "without voltage" in FIG. 5 for brevity). When the driving circuit 14 applies an appropriate voltage on the VA mode TFT LC panel, the LCs 20 and the dichroic dye 22 are driven to be arranged along a direction parallel to the substrate 18 (labeled "voltage on" in FIG. 5 for brevity).

Figure 6:
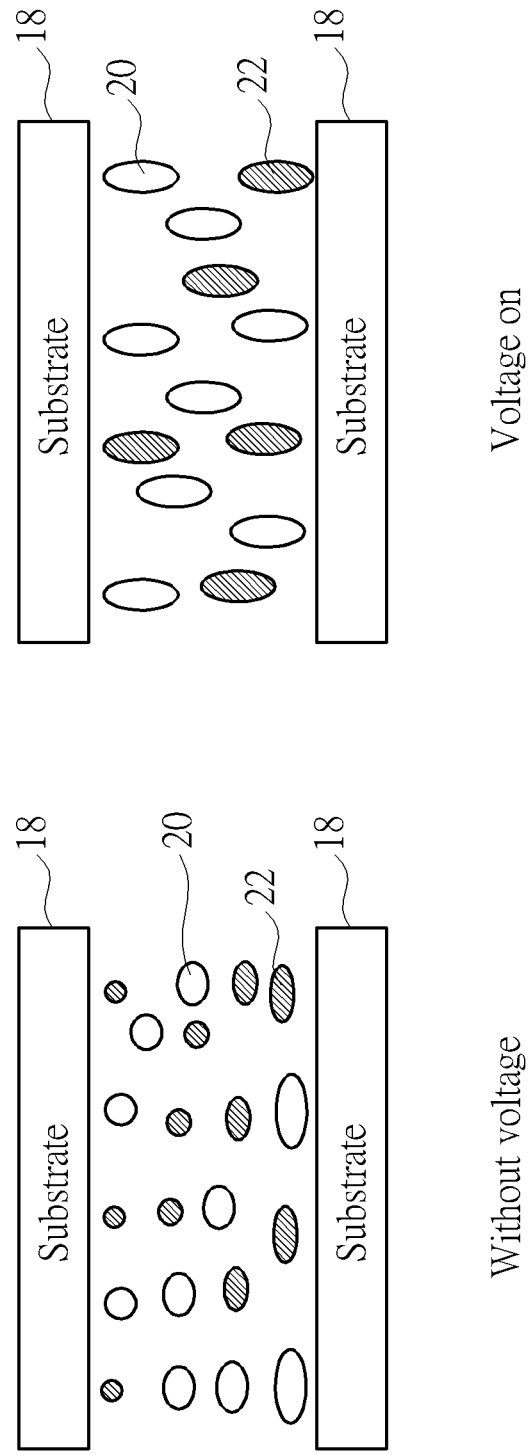
FIG. 6 is a diagram illustrating a plurality of LCs with dichroic dye in the LC panel in an LC mode of Twisted Nematic (TN) being not applied with voltage and being applied with voltage according to an embodiment of the present invention.

Please refer to FIG. 6. FIG. 6 is a diagram illustrating the LCs 20 with dichroic dye 22 in the LC panel 12 in an LC mode of Twisted Nematic (TN) being not applied with voltage and being applied with voltage according to an embodiment of the present invention. As shown in FIG. 6, when the LC panel 12 is a TFT LC panel and an LC mode of the LCs 20 in the TFT LC panel 12 is TN, the LCs 20 and the dichroic dye 22 have different direction according to different positions in the LC panel 12 (for example, as shown in FIG. 6, the LCs 20 and the dichroic dye 22 in the upper part are perpendicular to the LCs 20 and the dichroic dye 22 in the lower part, where the smaller LCs 20 and dichroic dye 22 represent different direction), and are arranged along a direction parallel to the substrate 18 without being applied with voltage (labeled "without voltage" in FIG. 6 for brevity). When the driving circuit 14 applies an appropriate voltage on the TN mode TFT LC panel, the LCs 20 and the dichroic dye 22 are driven to change directions and to be arranged along a direction perpendicular to the substrate 18 (labeled "voltage on" in FIG. 6 for brevity).

Figure 7:
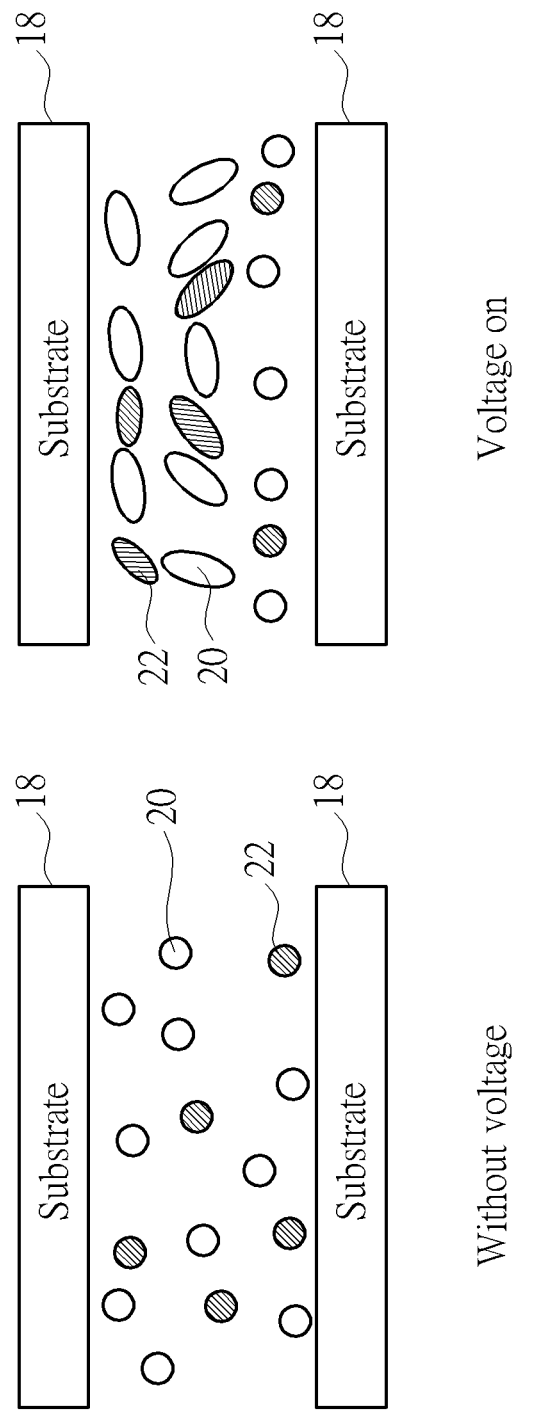
FIG. 7 is a diagram illustrating a plurality of LCs with dichroic dye in the LC panel in an LC mode of In-Plan Switching (IPS) being not applied with voltage and being applied with voltage according to an embodiment of the present invention.

Please refer to FIG. 7. FIG. 7 is a diagram illustrating the LCs 20 with dichroic dye 22 in the LC panel 12 in an LC mode of In-Plan Switching (IPS) being not applied with voltage and being applied with voltage according to an embodiment of the present invention. As shown in FIG. 7, when the LC panel 12 is a TFT LC panel and an LC mode of the LCs 20 in the TFT LC panel 12 is IPS, the LCs 20 and the dichroic dye 22 are arranged along a direction parallel to the substrate 18 when not applied with voltage (labeled "without voltage" in FIG. 7 for brevity). When the driving circuit 14 applies an appropriate voltage on the IPS mode TFT LC panel, a part of the LCs 20 and the dichroic dye 22 are driven to have different direction according to different positions in the LC panel 12 (labeled "voltage on" in FIG. 7 for brevity). For example, as shown in FIG. 7, the LCs 20 and the dichroic dye 22 in the upper part are perpendicular to the LCs 20 and the dichroic dye 22 in the lower part, and the LCs 20 and the dichroic dye 22 in the middle part are at different directions between the LCs 20 and the dichroic dye 22 in the upper part and in the lower part, where the smaller LCs 20 and dichroic dye 22 represent different direction.

Figure 8:
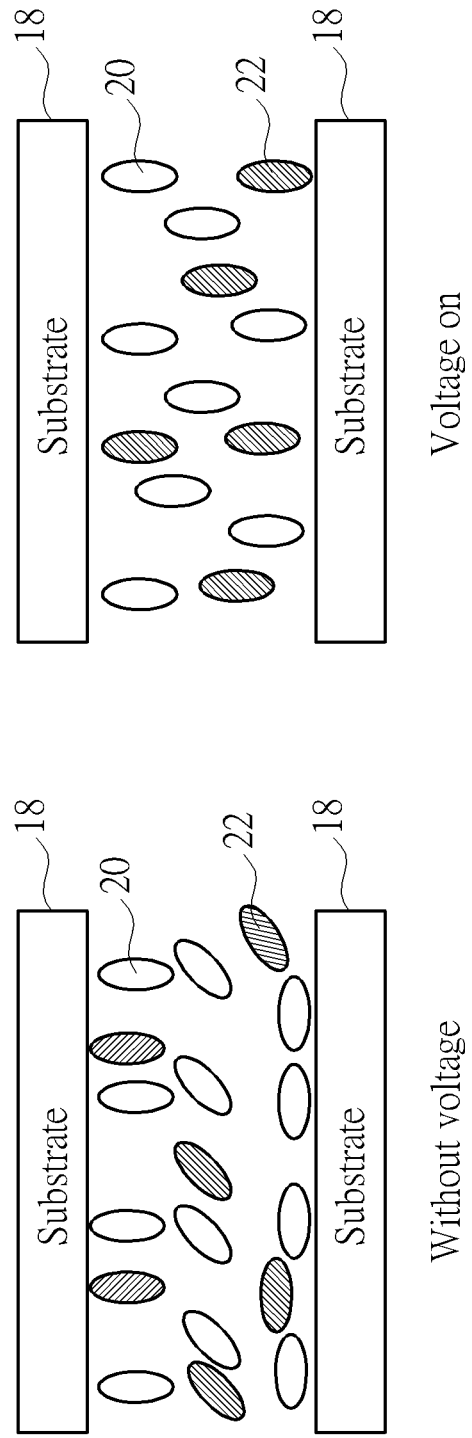
FIG. 8 is a diagram illustrating a plurality of LCs with dichroic dye in the LC panel in an LC mode of hybrid alignment being not applied with voltage and being applied with voltage according to an embodiment of the present invention.

Please refer to FIG. 8. FIG. 8 is a diagram illustrating the LCs 20 with dichroic dye 22 in the LC panel 12 in an LC mode of hybrid alignment being not applied with voltage and being applied with voltage according to an embodiment of the present invention. As shown in FIG. 8, when the LC panel 12 is a TFT LC panel and an LC mode of the LCs 20 in the TFT LC panel 12 is hybrid alignment, a part of the LCs 20 and the dichroic dye 22 are arranged along a direction parallel to the substrate 18 without being applied with voltage at a side, and another part of the LCs 20 and the dichroic dye 22 are arranged along a direction perpendicular to the substrate 18 without being applied with voltage at another side (labeled "without voltage" in FIG. 8 for brevity). When the driving circuit 14 applies an appropriate voltage on the hybrid alignment mode TFT LC panel, the LCs 20 and the dichroic dye 22 are driven to change shapes and to be arranged along a direction perpendicular to the substrate 18 (labeled "voltage on" in FIG. 8 for brevity).

Figure 9:
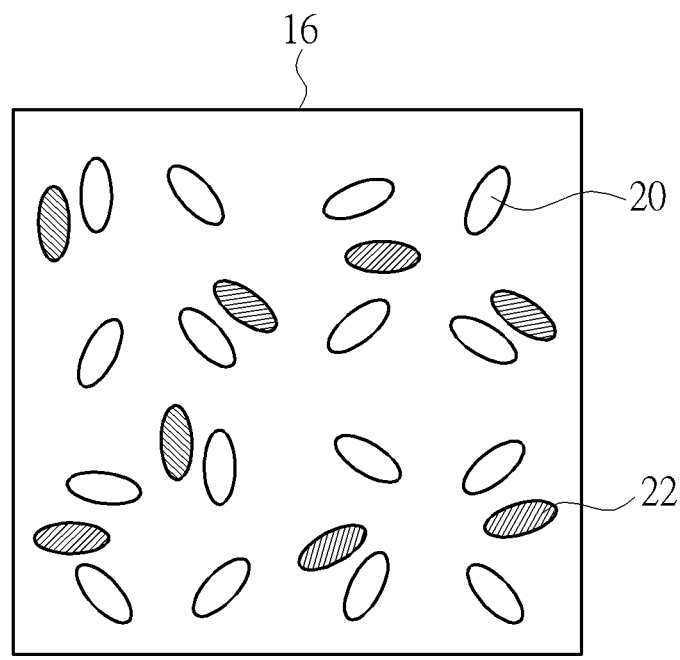
FIG. 9 is a diagram illustrating a sensitivity of the LC panel being settled by patterning alignment direction of the LCs in the LC panel.
Figure 10:
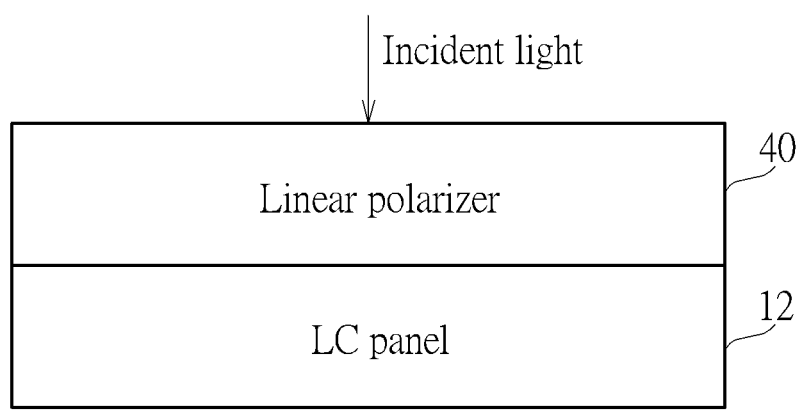
FIG. 10 is a diagram illustrating that a linear polarizer may be arranged between the LC panel and incident light according to an embodiment of the present invention.

Please refer to FIG. 9. FIG. 9 is a diagram illustrating a sensitivity of the LC panel 12 being settled by patterning alignment direction of the LCs in the LC panel 12. As shown in FIG. 9, when the dichroic dye 22 is arranged in a random fashion, the dichroic dye 22 may be set direction according to the surrounding LCs 20 locally, and the sensitivity of the LC panel 12 tends to polarization insensitive. When the LCs 20 and the dichroic dye 22 are arranged neatly, the sensitivity of the LC panel 12 tends to polarization sensitive. In other word, the arrangement of the LCs 20 and the dichroic dye 22 may determine the sensitivity of the LC panel 12. If the LC panel 12 tends to polarization sensitive, a polarization of incident light has to be a certain polarization to enter the LC panel 12. In addition, when the LC panel 12 is polarization sensitive, the linear polarizer 40 may be arranged between the LC panel 12 and incident light. The linear polarizer 40 is configured to define the polarization of the LC panel 12. In other words, the incident light becomes polarized after passing through the linear polarizer 40 to enter the LC panel 12. For example, the linear polarizer 40 may be iodine dopant, dichroic dye dopant or wire grid polarizer. Please refer to FIG. 10. FIG. 10 is a diagram illustrating that a linear polarizer 40 may be arranged between the LC panel 12 and incident light according to an embodiment of the present invention. As shown in FIG. 10. When the LC panel 12 is polarization sensitive, the linear polarizer 40 may be arranged between the LC panel 12 and incident light. The linear polarizer 40 is configured to define the polarization of the LC panel 12. In other words, the incident light becomes polarized after passing through the linear polarizer 40 to enter the LC panel 12. For example, the linear polarizer 40 may be iodine dopant, dichroic dye dopant or wire grid polarizer.

According to above arrangements, the dimmer 10 of the present invention is able to set the polarization direction and the sensitivity of polarization by arranging the LCs 20 and the dichroic dye 22. Compared to the prior art, the dimmer 10 does not require two polarizers, such that the maximum transmittance can be improved. Furthermore, the capacitor value of the storage capacitor is reduced or even the storage capacitor is removed, such that the aperture ratio of the pixel is improved greatly. In addition, each pixel 16 is designed to have a bigger size (e.g., 500 um) to reduce an effect of leakage current generated by reducing/removing the storage capacitor.

Figure 11:
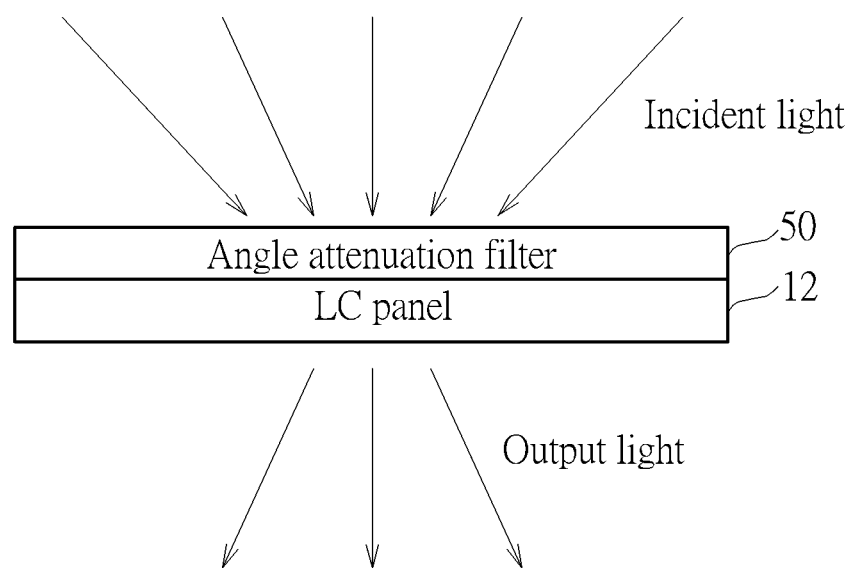
FIG. 11 is a diagram illustrating that an angle attenuation filter may be arranged between the LC panel and incident light according to an embodiment of the present invention.

In addition, the LC panel may be designed to be polarization insensitive by setting a polar angle and an azimuthal angle of LC alignment of the LCs 20, or by doping the LCs 20 with chiral dopant. In some embodiments, an incident angle of the incident light may be limited. Please refer to FIG. 11. FIG. 11 is a diagram illustrating that an angle attenuation filter 50 may be arranged between the LC panel 12 and incident light according to an embodiment of the present invention. As shown in FIG. 11, the angle attenuation filter 50 is arranged between the LC panel 12 and incident light, in order to filter incident light by an incident angle. The incident light with too large incident angle will be blocked, to control an emitting angle of the output light and uniformity of dimming.

In summary, the dimmer of the present invention can achieve a greater aperture ratio through reducing or removing the storage capacitor, and achieve a high maximum transmittance by using fewer polarizers. An LC panel of the dimmer is able to set the polarization direction and the sensitivity of polarization by arranging the LCs and the dichroic dye, such that the dimmer of the present invention can make the difference between brightness and darkness more obvious.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dimmer, comprising:
   a liquid crystal (LC) panel, having a plurality of LCs doped with dichroic dye, wherein the LC panel comprises a plurality of pixels; and
   a driving circuit, electrically connected to the LC panel, and configured to control driving of the plurality of pixels of the LC panel;
   wherein at least one of the plurality of pixels has a storage capacitor and an LC capacitor coupled in parallel, a ratio of a capacitance value of the LC capacitor to a capacitance value of the storage capacitor is greater than 10:1;
   wherein the driving circuit is configured to control an LC angle of LCs in each of the plurality of pixels, and the dichroic dye is driven by surrounding LCs and presents an angle correlated with the LC angle of the surrounding LCs.

2. The dimmer of claim 1, wherein the LC panel has an aperture ratio greater than 95%.

3. The dimmer of claim 1, wherein the LC panel is a thin-film transistor (TFT) LC panel, and an LC mode of the plurality of LCs in the TFT LC panel is Electrically Controlled Birefringence (ECB), Vertical Alignment (VA), Twisted Nematic (TN), In-Plan Switching (IPS) or hybrid alignment.

4. The dimmer of claim 1, wherein the plurality of LCs of the LC panel are arranged to be in geometric phase distribution and to create a specific diffusing angle.

5. The dimmer of claim 1, further comprising:
   an angle attenuation filter, arranged between the LC panel and incident light, and configured to limit an incident angle of the incident light, in order to confine a viewing angle of the dimmer.

6. The dimmer of claim 1, wherein the LC panel is polarization insensitive.

7. The dimmer of claim 6, wherein the LC panel is polarization insensitive by setting a polar angle and an azimuthal angle of LC alignment of the plurality of the LCs.

8. The dimmer of claim 6, wherein the LC panel is polarization insensitive by doping the plurality of the LCs with chiral dopant.

9. The dimmer of claim 1, wherein the LC panel is polarization sensitive.

10. The dimmer of claim 9, further comprising:
    a linear polarizer, arranged between the LC panel and incident light, and configured to define the polarization of the LC panel.

11. The dimmer of claim 10, wherein the linear polarizer is iodine dopant, dichroic dye dopant or wire grid polarizer.

* * * * *